United States Patent [19]
Gardeck et al.

[11] Patent Number: 5,381,479
[45] Date of Patent: Jan. 10, 1995

[54] METHOD FOR OVER THE AIR REKEYING OF MULTIPLE COMMUNICATION GROUPS

[75] Inventors: Kevin Gardeck, Algonquin; David A. Green, Bartlett; Kevin Cutts, Schaumburg, all of Ill.

[73] Assignee: Motorola, Inc., Schaumburg, Ill.

[21] Appl. No.: 203,468

[22] Filed: Feb. 28, 1994

[51] Int. Cl.⁶ .............................................. H04L 9/00
[52] U.S. Cl. ............................................. 380/21; 380/45
[58] Field of Search ..................... 380/21, 28, 48, 45, 380/49, 4

[56] References Cited

U.S. PATENT DOCUMENTS

| | | | |
|---|---|---|---|
| 5,146,498 | 9/1992 | Smith | 380/21 |
| 5,185,795 | 2/1993 | Bright | 380/21 |
| 5,208,859 | 5/1993 | Bartucci et al. | 380/21 |
| 5,301,232 | 4/1994 | Mulford | 380/21 |
| 5,325,432 | 7/1994 | Gardeck et al. | 380/21 |
| 5,329,573 | 7/1994 | Chang et al. | 380/21 |

*Primary Examiner*—David C. Cain
*Attorney, Agent, or Firm*—Timothy W. Markison

[57] ABSTRACT

In a secure communication system 100, communication units in different communication groups may be simultaneously rekeyed over the air by having a managing key unit 101 generate a key packet 121. This key packet 121, which includes a unit key 122, a key alias 123, and a key representation 125, is transported to at least one fleet key unit 102. Upon receiving the key packet 121, the fleet key unit determines, based on the key alias, which communication units of which communication groups are to be rekeyed. Once this is determined, the key representation 125, which represents the unit key (encryption key) 122, is transmitted to the communication units, thus rekeying multiple communication units in multiple communication groups simultaneously.

13 Claims, 2 Drawing Sheets

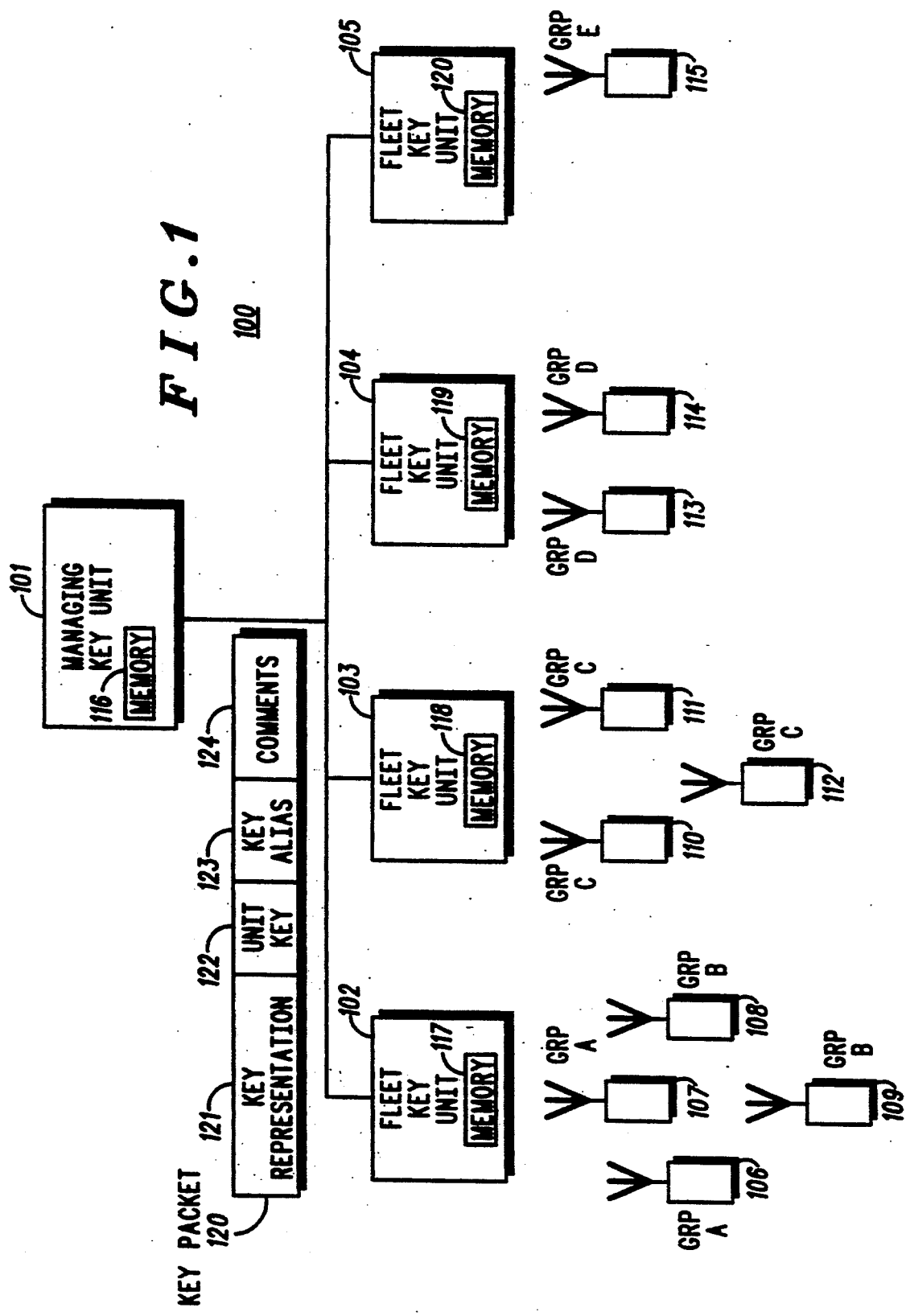

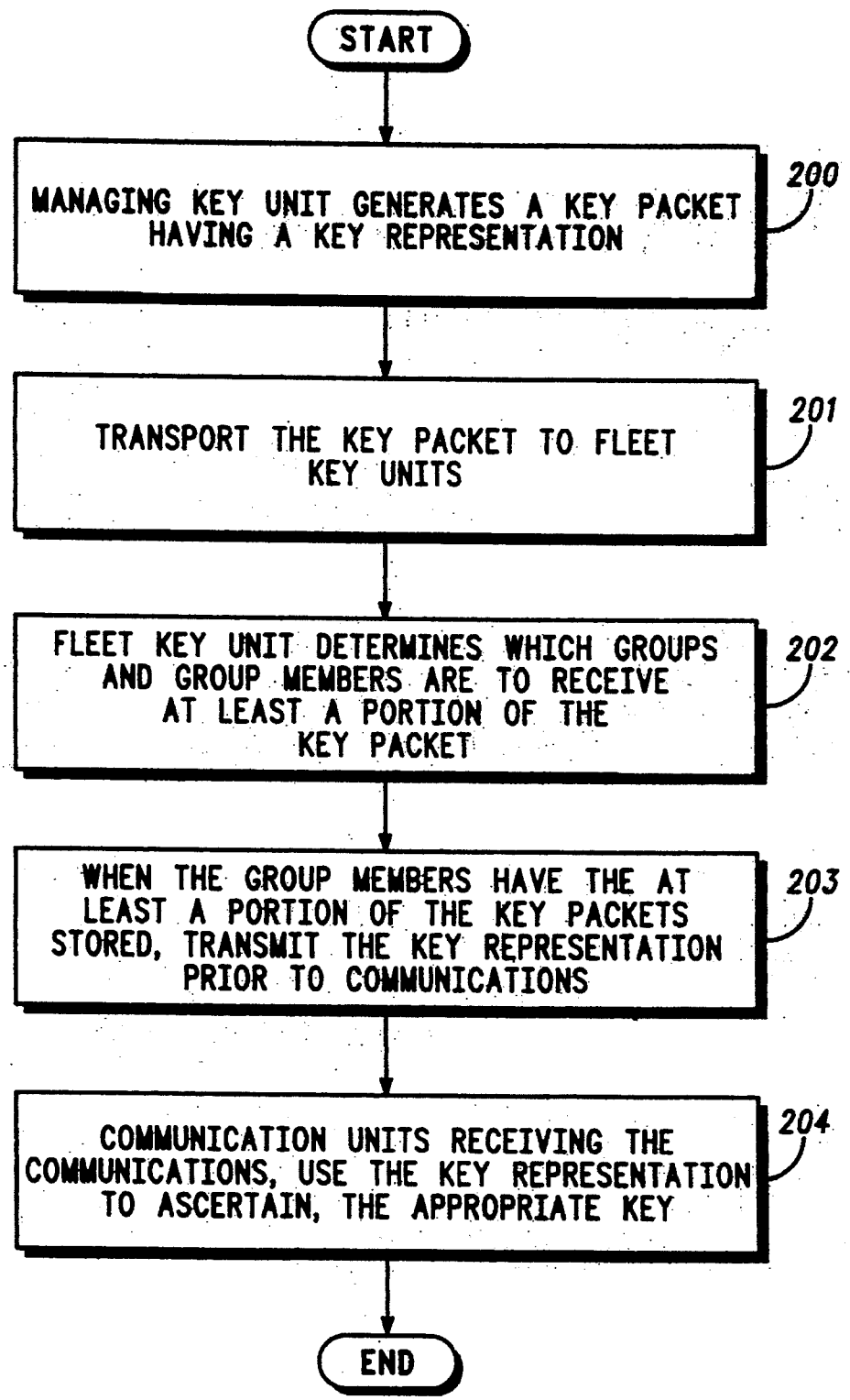

METHOD FOR OVER THE AIR REKEYING OF MULTIPLE COMMUNICATION GROUPS

FIELD OF THE INVENTION

This invention relates generally to secure radio communication systems, and, in particular, to over the air rekeying of communication units.

BACKGROUND OF THE INVENTION

Secure radio communication systems that encrypt information are known in the art. In such systems, a group of communication units can communicate securely when the group is assigned a key and each member of the group is provided with the key. In a secure communication system with many groups, many keys are required. Typically, the keys are managed by a Key Management Controller (KMC). Providing a key to a communication unit is often referred to as rekeying, and the KMC assigns keys to the communication units by Over-The-Air-Rekeying (OTAR), i.e. the communication units are rekeyed over a radio channel. Communication units may also be rekeyed with a Key-Variable-Loader (KVL), however, this method requires the communication unit and the KVL to be connected via an interconnecting cable prior to rekeying. Using OTAR or the KVL allows keys to be changed when desired.

Organizations, such as federal agencies, have operations in various locations through out a country. To manage the keys in a secure communications system used by such agencies, a KMC is provided at each location. Hence, a communication unit traveling from a location with a local KMC to a destination with a destination KMC, requires a key from the destination KMC in order to communicate securely at the destination. Rekeying the communication unit in this situation requires a substantial amount of cooperation between the operators of the local KMC and the destination KMC. For example, the local KMC must provide the communication unit with a unique shadow key, the communication unit must be entered into a database in the destination KMC, and the destination KMC must load the communication unit with the key upon arrival. As can be seen, this method is quite involved and requires a substantial amount of human input and interfacing. While this method works well for one or two units, when multiple groups of communication units need rekeying at multiple locations, the present method becomes complex and time consuming and is subject to human error.

Therefore a need exists for a method of rekeying multiple groups of secure communication units that can be done quickly, easily and without potential for human error while maintaining secure communications.

BRIEF DESCRIPTION OF THE DRAWINGS

FIG. 1 illustrates a functional block diagram of a secure wide area communications system in accordance with the present invention.

FIG. 2 illustrates a logic diagram detailing operation in accordance with the present invention.

DESCRIPTION OF A PREFERRED EMBODIMENT

Generally, the present invention provides a method for multi-communication group over-the-air-rekeying. This is accomplished when a managing key unit generates a key packet which includes a key alias and a unit key. Then, the managing key unit provides the key packet to at least one fleet key unit. Upon receipt, the fleet key unit determines the communication units that are to be rekeyed from the key alias. With the units identified, the fleet key unit transmits the unit key to the units, which may be from a plurality of groups. With such a method, multiple groups of communication units can be simultaneously rekeyed without the limitations of prior art rekeying methods.

The present invention can be more fully described with reference to FIGS. 1 and 2. FIG. 1 illustrates a secure wide area communication network 100 that includes a managing key unit 101, fleet key units 102–105, and communication units 106–115 such as Motorola Saber TM portable radios or Motorola Spectra TM mobile radios. Associated to each fleet key unit 102–105 are communication units 106–115 divided into operating groups. For example, fleet key unit 102 has associated communication units 106–109 operating in two groups, A and B. Each of the key units 101–105, which may be a KMC, includes a memory device 116–120 such as RAM, ROM, programmable memory or any other means of storing digital information. Communication between the key units 101–105 is provided over a link such as an Ethernet local area network utilizing a protocol such as Transmission Control Protocol/Internet Protocol (TCP/IP). When larger distances are encountered, a network bridge such as Telebit NetBlazer ST TM can be used to transport information from the Ethernet local area network, through telephone modems to a second bridge unit and onto another Ethernet network.

Rekeying information is transported in a key packet 120 from the managing key unit 101 to the fleet key units 102–105 via the link. The key packet 120 includes at least a key representation 121, a unit key 122, a key alias 123 and a comment field 124. The key representation 121 identifies the unit key 122 which may be one or more encryption keys. The key alias 123 identifies a predetermined group of communication units that are to receive the unit key 122, and the comment field 124 allows comments relating to the unit key 122, to be appended.

The key units 101–105 comprises a known hardware configuration with a programmable platform that can be configured to operate as described below in accordance with the invention.

With reference to FIG. 2, the managing key unit generates 200 a key packet having a key representation, a unit key, a key alias and an optional comment field. Note that the managing key unit is one of the key units selected to act as the managing unit. This is done to prevent conflict between key representations generated by the managing key unit and the fleet key units.

Typically, the managing key unit encrypts the key packet and immediately transports the encrypted key packet to the fleet key units using a TCP/IP message over an Ethernet network. Alternatively, the managing key unit may be configured to transport the encrypted key packet to the fleet key units at a particular time.

Upon receipt of the encrypted key packet, a fleet key unit decrypts the encrypted key packet to recapture the key packet. The fleet key unit then determines 202 which communication units of which groups are identified in the key alias. This determination may be done in a variety of ways. For example, the fleet key unit operator may make the decision or, the groups and group members can be predetermined, and stored in memory. Thus, the fleet key unit accesses its memory to retrieve the predetermined information and then automatically responds to the key packet. Regardless of how the determination is made, the fleet key unit transmits the unit key and the key representation to the identified units via OTAR. Upon receiving the rekeying information, each communication unit stores it and transmits 203 the key representation prior to communications. The groups and group members receiving the transmission use the key representation to ascertain 204 the unit key and proceed to communicate securely.

Additionally, groups and group members of a second fleet key unit that receive the transmission and are associated with the key alias, can also ascertain the unit key and communicate securely. Hence, communications is facilitated by such seamless operation that provides interoperability between communication groups associated with different fleet key units.

In secure communications systems the unit key can be changed frequently. To change the unit key the managing key unit generates a second key packet having a second key representation, a second unit key, the key alias and an optional comment field. The managing key unit transports the second key packet to the fleet key units. Upon determining, by a fleet key unit, that the key alias of the second key packet matches the key alias of the key packet that was received earlier, the fleet key unit further determines that the second key packet is providing a new version of the unit key. The fleet key unit then determines a suitable time to communicate the second unit key and the second key representation to the groups and group members associated with the key alias. In this way the unit key can be changed.

As a working example, consider a situation where a group of wanted terrorist attempt to escape from pursuing Federal agents by constantly moving from state to state. To coordinate the pursuit, the Federal agency needs to provide secure communications between and the pursuing agents and the local agents in each state during the pursuit. Using the managing key unit, that may be located at the headquarters of the agency, a key packet can be sent to the fleet key unit in any particular state that the terrorists may fled to, instructing the fleet key unit to provide a key to the secure communication units of the pursuing agents and the local agents, allowing the agents to communicate securely in each state. This capability will significantly enhance the ability of the agency to coordinate the pursuit and successfully apprehend the terrorists.

The present invention provides a method of rekeying multiple groups of secure communication units that can be done quickly, easily and without potential for human error while maintaining secure communications.

We claim:

1. A method for over the air rekeying of multiple communication groups, the method comprising the steps of:
   a) generating, by a managing key unit, a key packet that includes a key representation and keying information;
   b) transporting, by the managing key unit, the key packet to at least one fleet key unit;
   c) upon receipt of the key packet, determining, by the at least one fleet key unit based on the keying information, members of multiple communication groups to receive the key representation; and
   d) transmitting, by the at least one fleet key unit, the key representation to the members of multiple communication groups.

2. In the method of claim 1, step (b) further comprises, prior to transporting, encrypting, by the managing key unit, the key packet to produce an encrypted key packet.

3. In the method of claim 2, step (b) further comprises decrypting the encrypted key packet to recapture the key packet.

4. In the method of claim 1, step (a) further comprises generating the keying information to include at least a unit key and a key alias, wherein the key alias identifies the member of multiple communication groups and the unit key identifies an encryption key.

5. The method of claim 4 further comprises changing, by the managing key unit, the unit key by transporting a second key packet having a second unit key, a second key representation and the key alias to the at least one fleet key unit.

6. The method of claim 1 further comprises initiating, by a first member of the multiple communication groups, a secure communication by transmitting the key representation.

7. The method of claim 6 further comprises participating in the secure communication by a second member of the multiple communication groups by determining the unit key from the key representation.

8. A method for a key unit to manage over the air rekeying for multiple communication groups, the method comprises the steps of:
   a) generating a key packet that includes a key representation and keying information;
   b) transporting the key packet to at least one fleet key unit.

9. In the method of claim 8 step (b) further comprises, prior to transporting, encrypting the key packet to produce an encrypted key packet.

10. In the method of claim 8, step (a) further comprises generating the key packet to include a unit key and a key alias, wherein the key alias identifies member of the multiple communication groups and the unit key identifies an encryption key.

11. The method of claim 10 further comprises changing the unit key by transporting a second key packet having a second unit key, a second key representation and the key alias to the at least one fleet key unit.

12. A method for a key unit to participate in over the air rekeying of multi-communication groups, the method comprising the steps of:
   a) receiving a key packet that includes a key representation and keying information;
   b) determining, based on the keying information, members of multiple communication groups to receive the key representation; and
   c) transmitting the key representation to the members of multiple communication groups.

13. In the method of claim 12, step (a) further comprises, when the key packet is encrypted, decrypting the key packet to recapture the key representation and the keying information.

* * * * *